United States Patent [19]

Varga

[11] Patent Number: 4,903,422

[45] Date of Patent: Feb. 27, 1990

[54] LICENSE PLATE FRAME ASSEMBLY

[76] Inventor: Paul Varga, 213 Philadelphia Ave., Salisbury, Md. 21801

[21] Appl. No.: 128,926

[22] Filed: Dec. 4, 1987

[51] Int. Cl.⁴ .............................................. G09F 7/00
[52] U.S. Cl. ....................................... 40/201; 40/209
[58] Field of Search ................ 40/200, 209, 210, 201, 40/202

[56] References Cited

U.S. PATENT DOCUMENTS

| | | | |
|---|---|---|---|
| 1,660,575 | 2/1928 | Overton | 40/210 |
| 1,879,906 | 9/1932 | Linstrom | 40/209 |
| 1,927,564 | 9/1933 | Goldberg | 40/209 |
| 2,173,134 | 9/1939 | Vokaty | 40/209 |
| 3,187,452 | 6/1965 | Dotson | 40/209 |
| 3,315,394 | 4/1967 | Kluck | 40/209 |

Primary Examiner—Gene Mancene
Assistant Examiner—Michael Lynch
Attorney, Agent, or Firm—Thomas & Kennedy

[57] ABSTRACT

A license plate frame assembly is disclosed for displaying and projecting a vehicle license plate or identification tag. The assembly includes a generally rectangular frame with a rearwardly extending wall portion and an open center portion. A transparent plate abuts the frame and is confined within the wall portion to cover the open center. A rear panel, also confined within the wall portion, sandwiches the license plate between the transparent plate and the rear panel. The frame is secured from the rear portion thereof, fasteners being extended through a generally planar surface thereof, thereby preventing its unauthorized removal.

10 Claims, 1 Drawing Sheet

LICENSE PLATE FRAME ASSEMBLY

BACKGROUND OF THE INVENTION

This invention relates to a device for protecting and securing an identification tag or license plate to a vehicle or other such planar surface.

DESCRIPTION OF PRIOR ART

With the increasing use of personalized vehicle license plates or tags, protective devices have been developed for securing license plates or other identifying indicia to vehicles and for protecting the license plate from moisture, damage, and theft. In U.S. Pat. No. 2,641,046, a transparent plate is utilized as a protective shield for a license plate. The license plate is inserted through the side of the license plate holder which is comprised of a single layered, transparent case with front and rear walls. The holder is then sealed by a closure element on the open end of the transparent encasement. A dovetail tongue and slot arrangement seals the opening against contamination and employs no adhesive or flexible seals. U.S. Pat. No. 2,171,713 also utilizes an inspection window but makes no provision for sealing the enclosure from moisture and other contaminants, its primary function being to hold a multiplicity of identification tags in place in a single license holder and to prevent vibration of the license plates while the vehicle is moving.

SUMMARY OF INVENTION

It is, therefore, one of the principal objects of the present invention to provide an encasement for a license plate or identification tag that is impervious to foreign contaminants that include but are not limited to water, mud and paint, protecting the said license plate or identification tag from any type of disfigurement to its surface.

Another object of the present invention is to render the license plate or identification tag theft proof by employing the securing means of the license plate holder only in connection with the rear surface of the holder, the securing means extending through the surface or wall of the vehicle, such surface or wall being normally enclosed and locked.

A further objective of the present invention is to provide a decorative frame for the identification tag or license plate which does not require fastening means extending through the front surface of the license plate holder. The license plate holder will further be used as a decorative device by providing a surface and means for securing a decorative cloisonne of insert type or one that is integral with the frame or other decorative three dimensional emblem to the front surface of the frame, the insert or integral cloisonne with the frame being unknown in the present art.

These and additional objects are attained by the present invention which relates to a License Plate Frame Assembly which comprises a front frame member having a window portion including a transparent plate buttressing the front frame member, an adhesive seal connecting the transparent plate and the front frame member, a back panel, a flexible seal connecting the back panel to the front frame member and a means of securing the License Plate Frame Assembly to a surface of the motor vehicle, trailer or the like.

With these objectives in view as well as others which will appear in the course of the specification, reference will be made to the drawings.

DETAILED DESCRIPTION OF THE PREFERRED EMBODIMENT

Figure 1:
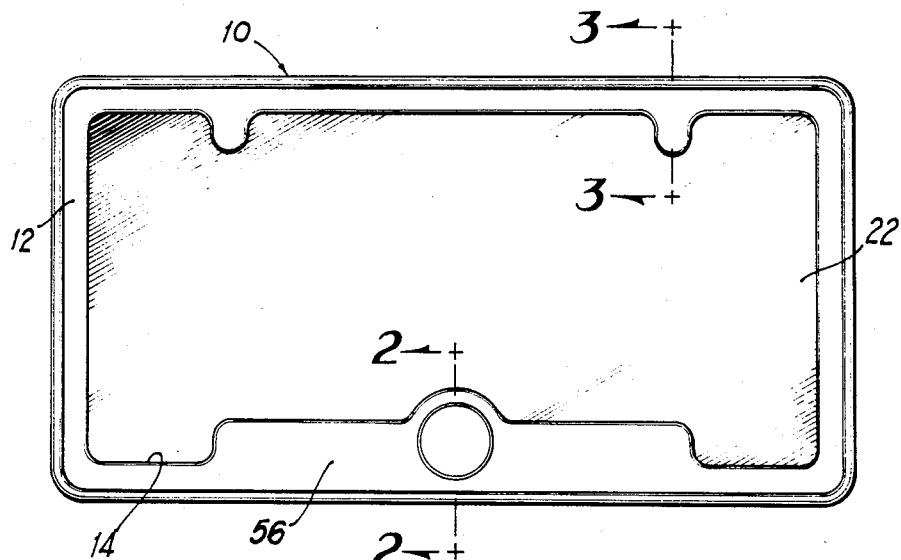
FIG. 1 is a front elevational view of the License Plate Frame Assembly.

In describing the invention in further detail, reference is directed to the several drawings where numeral 10 designates a frame member 10, the frame member being formed from a suitable lightweight plastic or metal. The frame is produced in, for example, an extrusion, stamping, forging or molding operation, depending on the material used. The exposed front surface 12 of the front frame member provides a decoratively shaped, smoothly curved surface to frame the license plate. The front frame member shown is generally rectangular with an open center defining a frame window portion 14 for displaying the identification tag or license plate when it is placed inside the License Plate Frame Assembly. The outer configuration may, of course, also take other forms, for example, elliptical frames are common in some countries. Thus, where an elliptical or other outer configuration is used, the other parts of the assembly hereinafter described are configured to conform to the outer frame.

The back surface 16 of the front frame member is generally flat and contains a groove 18 around the inner perimeter of the frame window 14, the function of which is described below. A wall extension 20 is formed around the outer perimeter of the front frame member 10 and extends outwardly toward the vehicle body 21 or the license plate mounting bracket (not shown) as the assembly is secured to the vehicle. Thus, from a side view, the frame member 10 has a generally C-shaped configuration.

Figure 2:
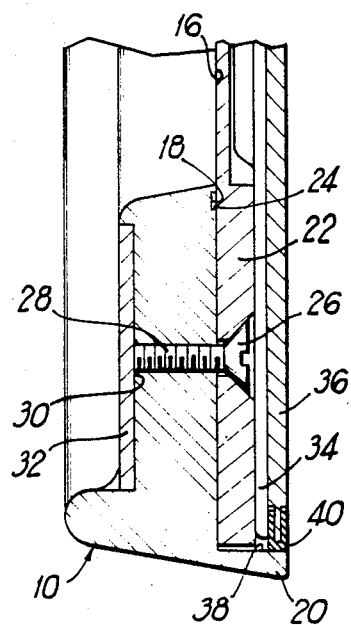
FIG. 2 is a cross sectional view, the view being taken on Line 2—2 of FIG. 1.
Figure 3:
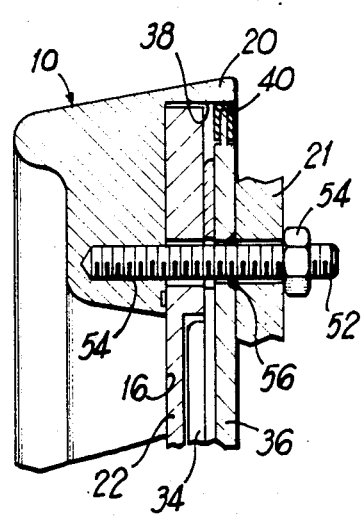
FIG. 3 is a cross sectional view, the view being taken on Line 3—3 of FIG. 1.

A transparent plate 22 abuts the inner edges of the back surface 16 of the frame member 10 and is sealed thereto by an adhesive means 24 placed inside the groove 18 around the inner perimeter of the back surface 16 of frame member 10. The area of the transparent plate 22 is such that it is received within the perimeter defined by the wall extension 20, as shown in FIGS. 2 and 3. In addition, the area of the transparent plate is larger than the area of the frame window hole 14 as defined by the inner perimeter of the frame 10, thus completely covering the frame window area.

The transparent plate 22 is further secured to the frame at the bottom as viewed in FIG. 1 by a screw 26 or other suitable means, which is countersunk into the transparent plate and disposed through the rear surface of the frame through an aligned threaded opening 28. As shown in FIG. 2, the screw is countersunk into the transparent plate 22 a sufficient distance to hold the transparent plate in place and to prevent the head of the screw from projecting outside the plane of the rear surface of the transparent plate. The opening through the frame extends to a point near the front surface of the frame 10 where the screw 26 is threadedly received within a threaded opening or hole 30, disposed in a multidimensional decorative object or cloisonne 32 that is displayed on the front surface of the frame. The identification tag or license plate 34 is placed against the rear side of transparent plate 22 with the front surface of the license abutting the rear surface of the transparent plate. A rear panel 36 is disposed adjacent the rear surface of the license plate, thereby enclosing the license plate within the license plate frame assembly.

The perimeter measurement of the rear panel is less than the perimeter measurement of the interior wall surface 38 of the wall extension 20. The edges of the rear panel are sealed to the interior wall surface 38 of the wall extension, the edges of the rear panel being surrounded by a generally U-shaped elastomeric seal 40. The seal extends around the entire perimeter of the real panel. The seal is also further secured around the perimeter of the interior wall surface with a suitable adhesive or other means applied to the edges of the rear panel.

The License Plate Frame Assembly is attached to any substantially planar surface such as the vehicle body 21, or a license plate holding bracket (not shown) by inserting fasteners such as screws 52 through aligned openings, respectively extending through the planar surface 21, the rear panel 36, the identification tag or license plate 34, the transparent plate 22 and into threaded openings 54 formed in the frame member 10 near the upper rim of the frame 10. In this manner, the existing holes in the license plate, which normally accept conventional securing means, are used for securing the license plate within the present assembly. The number of screws may vary depending on the particular vehicle and/or plate being displayed; however, there are normally four such fasteners for each plate or tag.

The exposed end of each screw 52 is secured to the mounting surface 21 by nut 54 thus preventing the license plate frame assembly from being removed from the exposed side of the surface on which it is mounted. The screws 52 are surrounded by O-rings 56 or other suitable seal at the interface of the vehicle body 21 and the rear panel 36. Thus, it can be seen from FIGS. 2 and 3 that a completely sealed enclosure is provided for the license plate, preventing the ingress of moisture and other contaminants. The combination thus becomes similar to a labyrinth seal when assembled, thereby providing the required effectiveness. Similarly and equally important, the mounting screws 52, being disposed, for example, inside the trunk or against the inner surface of a bumper, effectively deter the theft of the license plate as well as the present frame assembly.

In addition to the insert type cloisonne 32, the front surface 12 of the frame 10 includes an extended surface portion 56 which may be used as an integral type cloisonne for the name of a state, automobile dealership, make of automobile, etc. The mounting hardware is completely enclosed, with no fasteners extending outside the front surface, thus providing a decorative and protective assembly heretofore unknown in the art.

While an embodiment and modifications of a license plate frame assembly have been shown and described in detail herein, various additional changes and modifications may be made without departing from the scope of the present invention.

I claim:

1. A theft resistant license plate frame assembly designed for protecting and displaying a license plate or tag on a vehicle, said assembly comprising:
   (a) a substantially planar surface of the vehicle for receiving said assembly, said planar surface having a generally protected rear surface and a front surface adjacent which said assembly is disposed and a frame member having an outer peimeter and an open center portion defining a window for exposing the display surface of the license plate placed within said assembly, said frame member having a wall extension projecting radially from the outer perimeter of said frame member;
   (b) a transparent plate means disposed adjacent said frame member and covering said center window portion for protecting the front display surface portion of said license plate;
   (c) a back panel secured to the rear of the frame member and having a seal means disposed around the outer perimeter thereof, said sealing means being confined within said wall extension for holding said back panel in place and sealing the area between said back panel and said transparent plate;
   (d) fastening means disposed through said planar surface and into said frame member for securing said frame member to said planar surface and preventing removal of said fastening means from said front surface; and
   (e) an adhesive means for sealing said frame member for preventing the ingress of contaminants.

2. A license plate frame assembly as defined in claim 1 and further comprising a three dimensional decorative object secured to said frame member with second fastening means disposed through said frame member and into said object, said second fastening means being disposed between said license plate and said object.

3. A license plate frame assembly as defined in claim 1 and including a cloisonne integral with said frame member.

4. A license plate frame assembly as defined in claim 1 in which said fastening means includes a plurality of screws extending through said planar surface, said back panel, said license plate and said transparent plate into and threadedly engaged in said frame member and nuts threadedly engaged with said screws and disposed on the side of said planar surface opposite said frame assembly for preventing unauthorized removal of said frame assembly.

5. A license plate frame assembly as defined in claim 1 which said frame member includes a continuous groove formed in the rear surface thereof, and an adhesive means disposed in said groove for sealing said transparent plate to said frame member.

6. A theft-resistant license plate frame assembly for displaying and protecting a vehicle license plate or identification tag said assembly comprising a substantially planar mounting surface of a vehicle, a generally rectangular frame member having means defining an open center portion for viewing the license plate, said frame member having an outer perimeter and a front and rear surface with a wall extension extending rearwardly from said front surface around the outer perimeter thereof, a transparent plate member disposed adjacent said rear surface and confined within said wall extension, a rear panel member having a sealing means disposed around the perimeter thereof and confined within said wall extension for sandwiching the license plate between said rear panel and said transparent plate, and fastening means disposed respectively through said planar mounting surface and extending partially into said frame, with securing means for said fastening means disposed on the side of said planar surface opposite the mounted position of said assembly for preventing the unauthorized removal of said assembly.

7. A license plate frame assembly as defined in claim 6 and further comprising a three dimensional decorative object secured to said frame member.

8. A license plate frame assembly as defined in claim 7 which said frame member includes a continuous groove formed in the rear surface thereof and an adhesive means disposed in said groove for sealing said transparent plate to said frame member.

9. A license plate frame assembly as defined in claim 6 which said frame member includes a continuous groove formed in the rear surface thereof and an adhesive means disposed in said groove for sealing said transparent plate to said frame member.

10. A license plate frame assembly as defined in claim 9 in which said frame member includes an extended, unobstructed outer surface portion for receiving a state name or the like.

\* \* \* \* \*